(12) United States Patent
Peele

(10) Patent No.: US 7,495,926 B2
(45) Date of Patent: Feb. 24, 2009

(54) INTERFACE MODULE FOR ELECTRONIC DEVICES

(75) Inventor: James C. Peele, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 326 days.

(21) Appl. No.: 10/711,784

(22) Filed: Oct. 5, 2004

(65) Prior Publication Data
US 2006/0072293 A1    Apr. 6, 2006

(51) Int. Cl.
*H05K 7/02* (2006.01)
(52) U.S. Cl. .............. 361/737; 235/441; 257/679; 439/946
(58) Field of Classification Search .......... 361/737, 361/764, 752; 235/492, 494, 441; 257/679, 257/678; 439/945, 946
See application file for complete search history.

(56) References Cited

U.S. PATENT DOCUMENTS

| | | | | |
|---|---|---|---|---|
| 4,326,125 A | * | 4/1982 | Flies | 340/5.65 |
| 4,511,796 A | * | 4/1985 | Aigo | 235/492 |
| 4,659,915 A | * | 4/1987 | Flies | 235/441 |
| 4,822,988 A | * | 4/1989 | Gloton | 235/492 |
| 4,845,452 A | * | 7/1989 | Sasaki et al. | 336/200 |
| 5,151,774 A | * | 9/1992 | Mori et al. | 257/688 |
| 5,193,220 A | * | 3/1993 | Ichinohe et al. | 455/343.1 |
| 5,350,945 A | * | 9/1994 | Hayakawa | 257/679 |
| 5,526,233 A | * | 6/1996 | Hayakawa | 361/737 |
| 5,526,662 A | | 6/1996 | Diekhoff et al. | |
| 5,550,402 A | | 8/1996 | Nicklaus et al. | |
| 5,736,781 A | * | 4/1998 | Atsumi | 257/679 |
| 5,831,827 A | * | 11/1998 | Fekete et al. | 361/728 |
| 6,193,163 B1 | * | 2/2001 | Fehrman et al. | 235/488 |
| 6,270,613 B1 | * | 8/2001 | Nakagawa et al. | 156/235 |
| 6,276,608 B1 | * | 8/2001 | Cockayne et al. | 235/492 |

(Continued)

FOREIGN PATENT DOCUMENTS

EP    1 063 862 A1    12/2000

(Continued)

OTHER PUBLICATIONS

Sony Ericsson Mobile Communications AB, International Application No. PCT/US2005/020216, International Search Report, Oct. 28, 2005.

(Continued)

*Primary Examiner*—Dean A. Reichard
*Assistant Examiner*—Dameon E Levi
(74) *Attorney, Agent, or Firm*—Matthew W. Witsil; Moore & Van Allen, PLLC

(57) ABSTRACT

An interface module in a nonplanar form. The interface module includes an electronic device card, such as a SIM or memory card, in a cross-sectional shape that may be, for example, substantially a circle or ellipse, substantially rectangular meeting certain dimensional requirements, or a shape other than a rectangle having at least three sides. Selected embodiments of the card may be a shape other than one having parallel major surfaces. An interface module assembly includes a card and a card reader. Electrical contacts are provided on both the card and the card reader. The contacts on the card may extend around the card to improve opportunity for continuous contact.

8 Claims, 8 Drawing Sheets

U.S. PATENT DOCUMENTS

| | | |
|---|---|---|
| 6,400,965 B1 | 6/2002 | Phillips et al. |
| 6,433,995 B2 * | 8/2002 | Nakagawa et al. ........... 361/311 |
| 6,445,593 B1 * | 9/2002 | Okuyama .................... 361/765 |
| 6,554,193 B1 * | 4/2003 | Fehrman et al. .............. 235/488 |
| 6,618,258 B2 * | 9/2003 | Goris ......................... 361/737 |
| 6,629,245 B1 | 9/2003 | Stone |
| 7,053,314 B1 * | 5/2006 | Camerlo ..................... 174/260 |
| 7,061,769 B1 * | 6/2006 | Chang et al. ................. 361/737 |
| 7,158,008 B2 * | 1/2007 | Waring et al. .............. 340/5.66 |

FOREIGN PATENT DOCUMENTS

| | | |
|---|---|---|
| FR | 2 622 330 A | 4/1989 |
| WO | WO 2004/036467 A1 | 4/2004 |

OTHER PUBLICATIONS

Sony Ericsson Mobile Communications AB, International Application No. PCT/US2005/020216, Written Opinion, Oct. 28, 2005.

* cited by examiner

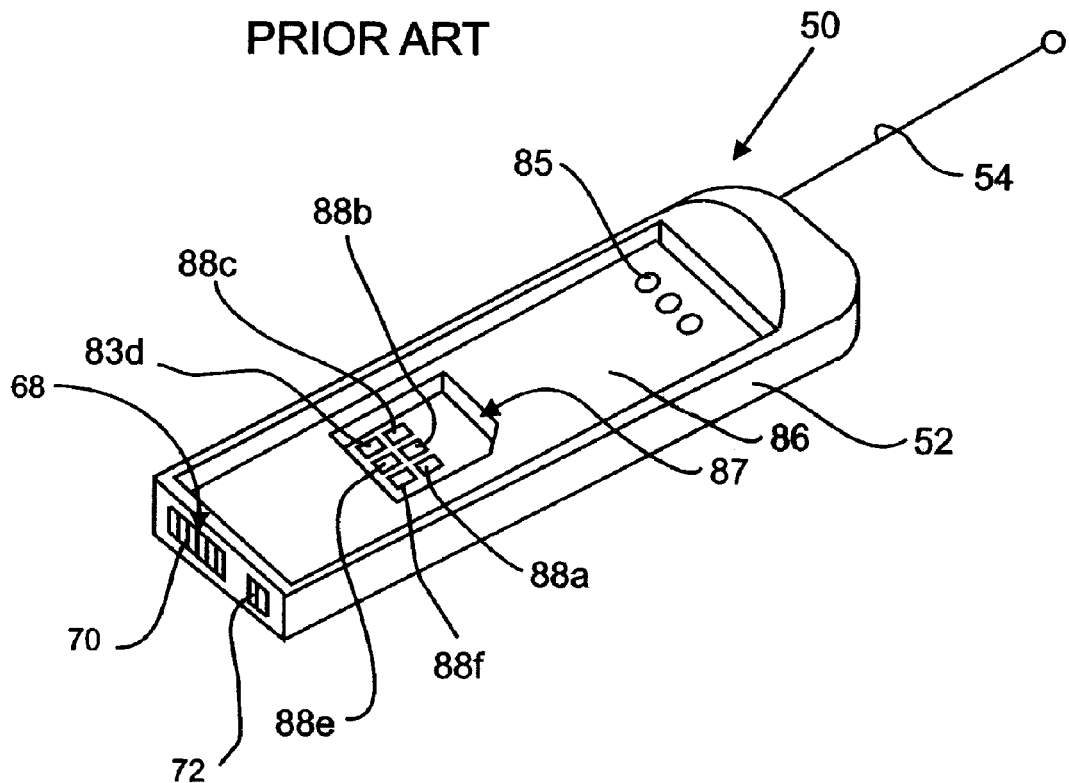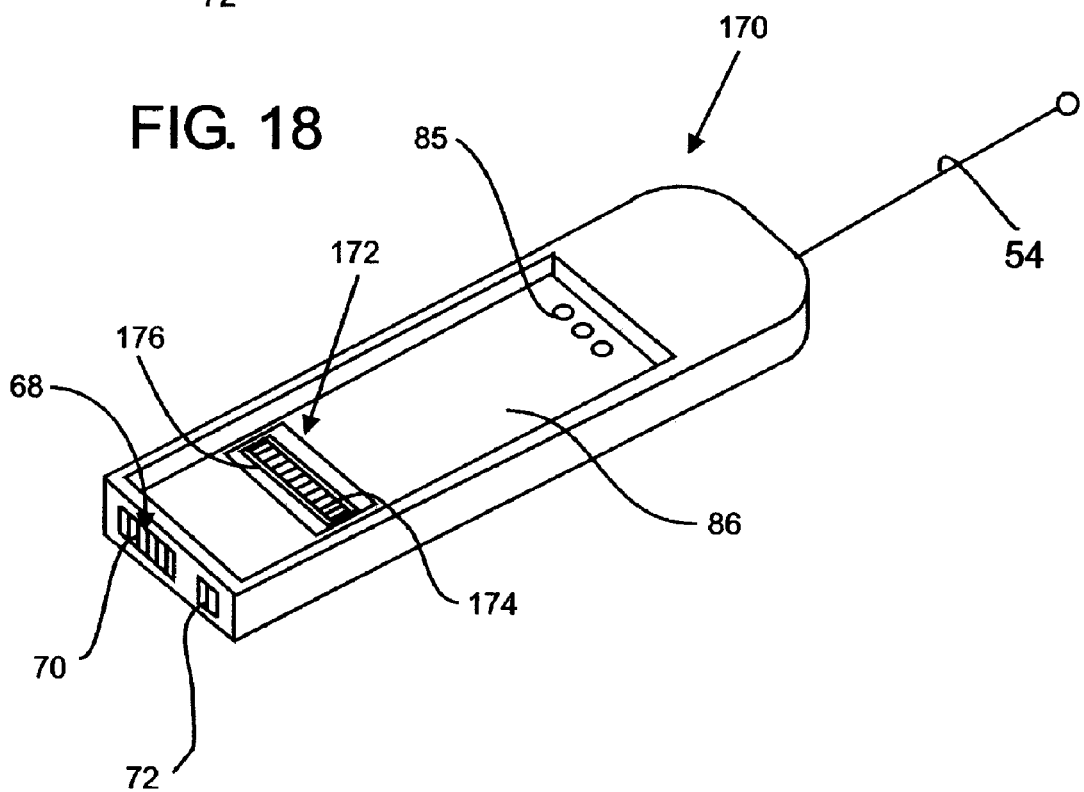

INTERFACE MODULE FOR ELECTRONIC DEVICES

FIELD OF THE INVENTION

This invention relates to the field of interface modules for electronic devices, and more particularly, to cards or the like that may include, but not be limited to, memory, memory and a processor combined, digital signal processors, and power sources, and associated card readers.

BACKGROUND

Many electronic devices include modules or plug-ins that perform a variety of functions. Such devices may be portable and may include, but are not limited to, cellular telephones, notebook computers, personal digital assistants (PDAs), calculators, and handheld games or controllers, or any device in which a removable memory, memory and processor combined, digital signal processor, or power source card is desired. There is an ongoing effort to reduce device size. As the size of electronic devices decreases, the reduction of the size of various components within each device becomes valuable and desirable in order to decrease the overall device size.

One example of the various mobile telecommunication devices in which such a card may be desired includes devices operating on the Groupe Special Mobile (also known as GSM or Global System for Mobile Communications) standard digital cellular phone service. Such devices commonly incorporate the use of a Subscriber Identity Module (SIM) card having standard SIM reader electrical contacts. A card reader typically receives a SIM card with contacts corresponding to the standard SIM card contacts. The SIM card reader may be integral to the mobile telecommunication device, and is often accessible beneath the battery. The SIM card may be installed or inserted into the SIM card reader of the mobile telecommunication device, linking that mobile telecommunication device to the subscriber-related information stored on the SIM card. The subscriber-related information facilitates a telephone call from any valid mobile communication device, because the subscriber-related information is used to complete the call rather than specific internal physical identifiers (such as an internal serial number) that may be associated with the mobile telecommunication device.

In general, the form factors of conventional SIMs are substantially planar, and in some cases SIMs may be about the size of a postage stamp. The size and shape of SIMs and other removable cards may limit desired reduction in size of the device in which the cards are disposed. Consequently, a need exists to reduce the size or change the shape of such cards to allow reduction in size or change of shape of the host device.

SUMMARY OF THE INVENTION

In accordance with an embodiment of the present invention, an interface module for an electronic device is provided, including a card with a body and at least one of memory, processor, power source, or other apparatus that includes desired functionality as known to one of ordinary skill in the art. The body has a longitudinal axis. The body has a cross-sectional shape other than one bounded by substantially parallel major surfaces. Examples of cross-sectional shapes of the body include substantially circular or substantially elliptical. Electrical contacts may be spaced along the longitudinal axis of the body and may extend substantially around the periphery of the body.

In accordance with another embodiment of the present invention, an interface module for an electronic device includes a card with a body and at least one component selected from the group including memory, a processor, and a power source. The body has a longitudinal axis and a cross-sectional shape other than substantially planar. A substantially planar shape is one having a height to width ratio of less than approximately 0.5. Examples of cross-sectional shapes of the body include substantially rectangular and shapes other than a rectangle having at least three substantially straight sides.

In accordance with another embodiment of the present invention, an interface module for an electronic device is provided including a card with a body and at least one component selected from the group including memory, a processor, and a power source. The body has a longitudinal axis, and the cross-sectional shape of the body is selected from the group including substantially circular, substantially elliptical, substantially rectangular and having a height to width ratio of at least 0.5, and a shape other than a rectangle having at least three substantially straight sides.

In accordance with another embodiment of the present invention, an interface module assembly for an electronic device is provided, including a card reader, a card, and electrical contacts. The card reader defines an opening and has a longitudinal axis. The card is reciprocally mounted to the card reader and is disposed in the opening. The card includes a body having a longitudinal axis and at least one component selected from the group including memory, a processor, and a power source. The electrical contacts are spaced along the longitudinal axis of the card body and of the card reader, and the electrical contacts on the card reader and the electrical contacts on the card body are in close and complementary registration. The cross-sectional shape of the body is selected from the group including substantially circular, substantially elliptical, substantially rectangular and having a height to width ratio of at least 0.5, and a shape other than a rectangle having at least three substantially straight sides.

In accordance with another embodiment of the present invention, a mobile terminal is provided including a housing and an interface module assembly. The interface module assembly is disposed in the housing and includes a card reader defining an opening and a card reciprocally mounted to the card reader, disposed in the opening. The card reader includes a body and at least one component selected from the group including memory, a processor, and a power source. The cross-sectional shape of the body is selected from the group including substantially circular, substantially elliptical, substantially rectangular and having a height to width ratio of at least 0.5, and a shape other than a rectangle having at least three substantially straight sides.

In accordance with another embodiment of the present invention, a method of making an interface module is provided. A cross-sectional shape of the interface module is selected. A frame is provided including material for structural support and material for active leads including bonding pads. A position for a die is selected within the limits of the prospective interface module. The die is placed in position and is supported by means for structural support. The bonding pads of the active leads are bonded to the die, with a length of each active lead left exposed outside of the limits of the prospective interface module. The die and active leads are encapsulated to form the body of the interface module. The frame material used for structural support and outside the limits of the interface module body is trimmed away. The exposed active leads are wrapped and secured around the interface module.

Features and advantages of the present invention will become more apparent in light of the following detailed description of some embodiments thereof, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF DRAWINGS

FIG. 3 is a perspective view including the rear face of the prior art mobile terminal of FIG. 1 with a portion of the back of the mobile terminal removed.

FIG. 18 is a perspective view including the rear face of an embodiment of a mobile terminal in accordance with the present invention.

DETAILED DESCRIPTION OF THE INVENTION

Figure 1:
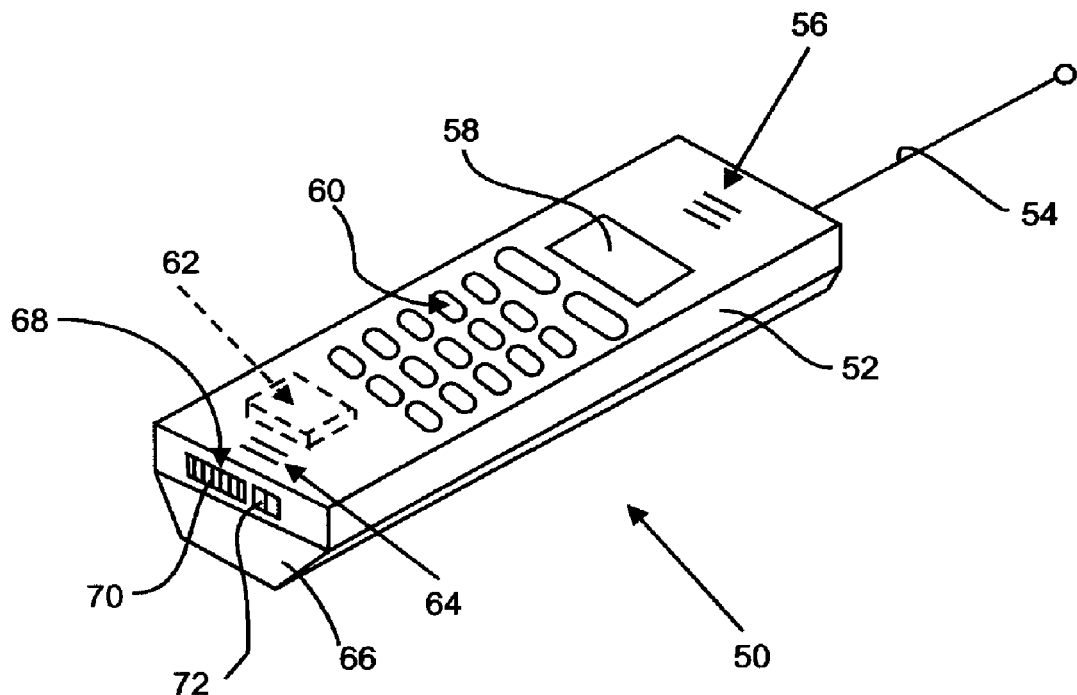
FIG. 1 is a perspective view including the front face of a prior art mobile terminal.

FIG. 1 shows a typical mobile terminal 50. As used herein, the term "mobile terminal" may include, among other things: a cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; a conventional laptop and/or palmtop receiver or other appliance that includes a radiotelephone transceiver; a calculator; a handheld game or controller; and a personal music playback system such as for CDs, minidisks, MP-3 files, memory sticks, or the like. Conventional interface modules for such devices are, in general, substantially planar. The present invention may provide the ability to reduce the form factor and change the shape of associated modules. This may allow a module to conform to space requirements and may permit for reduction in size of the overall device.

Figure 2:
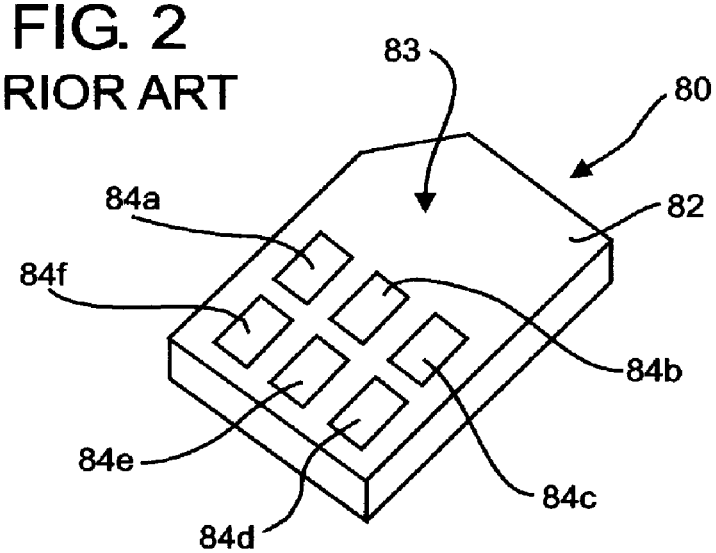
FIG. 2 is a perspective view of a SIM of the prior art as may be used in the prior art mobile terminal of FIG. 1.

The mobile terminal 50 may include, for instance, a housing 52, an antenna 54, a speaker 56, a display 58, a keypad 60, a memory 62 located internal to the housing 52, a microphone 64, a battery 66, a system connector 68 with one or more connection terminals 70, and one or more additional connection terminals 72. FIG. 2 shows an interface module, in this case being a SIM card 80. Many other types of interface modules exist, and it should be understood that a SIM card is but one type, to which the present invention is not limited. A SIM card 80 may have a body 82 and six SIM card electrical contacts 84a-84f, although it will be recognized that any number of SIM card data contacts would fall within the scope of the invention. The SIM card 80 is substantially flat, or substantially planar, and has a first major surface 83 that is substantially parallel to a second major surface, opposite the second major surface and not visible in FIG. 2. A major surface is the surface on the part having the greatest area. As shown in FIG. 3, which shows the rear face of the mobile terminal with the battery 66 removed and battery contacts 85 and battery area 86, a SIM card reader 87 may be integral to the mobile terminal, sometimes accessible beneath the battery 66.

The SIM card reader 86 has contacts 88a-88f that correspond respectively to the SIM card contacts 84a-84f. The SIM card reader 87 may be connected to SIM card reader circuitry (not shown). The SIM card 80 may be installed or inserted into the SIM card reader 87 of the mobile telecommunication device 50. The card contacts 84a-84f are electrically connected to the reader contacts 88a-88f, as the contacts 84a-84f, 88a-88f are in close and complementary registration, thereby linking that mobile terminal 50 to the subscriber-related information stored on the SIM card 80. Although the card 80 used for discussion herein is a SIM card, it should be understood that the card could be any one of a variety of cards that include, for example, memory, a processor, or a power source, or other device providing functionality as desired. The invention is not limited by the type of card; rather, the use of SIMs, for the purpose of discussion, is merely one embodiment of the invention. The combination of a card, or interface module, and a card reader makes up an interface module assembly.

Figure 4:
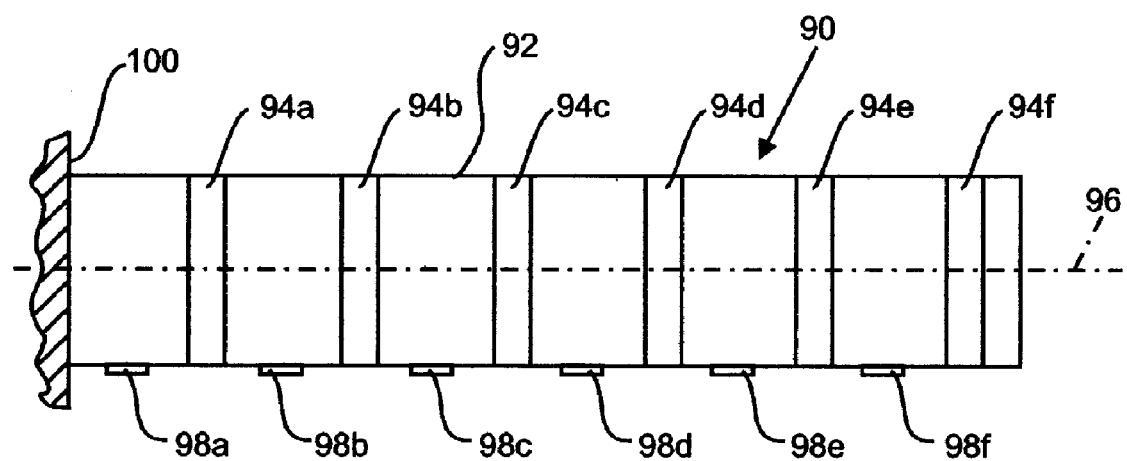
FIG. 4 is a top plan view of an embodiment of an interface module according to the present invention.
Figure 5:
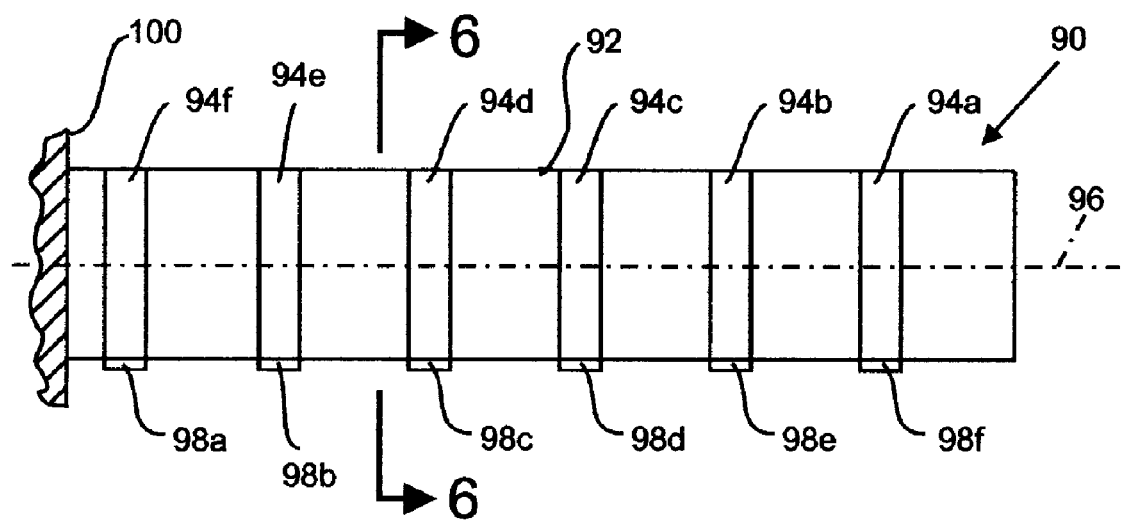
FIG. 5 is a top plan view of the interface module of FIG. 4, reversed in position.

FIGS. 4 and 5 show an embodiment of a SIM card 90 according to the present invention. The SIM card 90 includes a body 92 and electrical contacts 94a-94f, and has a longitudinal axis 96 along the body 92. The electrical contacts 94a-94f on the card 90 are longitudinally spaced along the body 92. The electrical contacts 98a-98f for a card reader (not shown) are schematically depicted, and match the spacing of the card contacts 94a-94f. In each figure the card 90 abuts a physical stop 100. The configuration of FIG. 4, however, does not allow the card contacts 94a-94f to be in registration with the card reader contacts 98a-98f, because the card is disposed in a reverse position from the correct orientation, which is shown in FIG. 5. In FIG. 5 the card contacts 94a-94f are in close and complementary registration with the card reader contacts 98a-98f. Unequal spacing of the card contacts at the ends of the card provide for correct installation orientation.

Figure 6A:
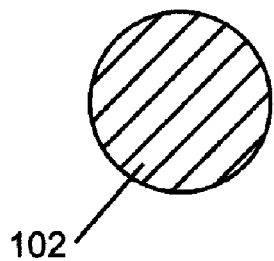
FIGS. 6A, 6B, and 6C are section views showing various shapes of interface module embodiments taken along line 6-6 of FIG. 5.
Figure 6B:
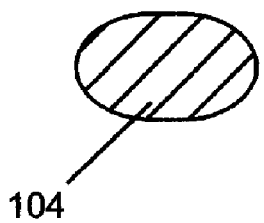
Figure 6C:
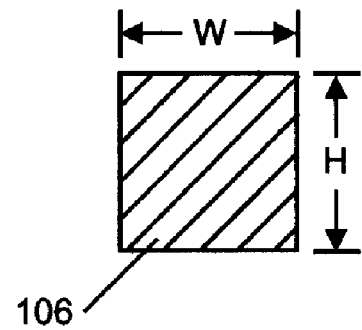

The card 90 may be a variety of shapes as viewed on a plane perpendicular to the axis, which is the cross-section taken along line 6-6 of FIG. 5. Such shapes are shapes other than planar and include but are not limited to shapes that are substantially circles 102, ellipses 104, and rectangles 106, as shown in FIGS. 6A, 6B, and 6C respectively. Other shapes that change the form factor of the card from that of a substantially planar card may also be selected by one of ordinary skill in the art, such as any shape that has at least three substantially straight sides. "Substantially rectangular" or other shapes may be considered to be nonplanar when the height to width ratio (H/W, FIG. 6C) is at least approximately 0.5. Height, or thickness, H, is the shortest overall dimension in cross-section, and width, W, is the longest overall dimension perpendicular to H. A shape may be considered to be planar when the height to width ratio is less than approximately 0.5.

Figure 7:
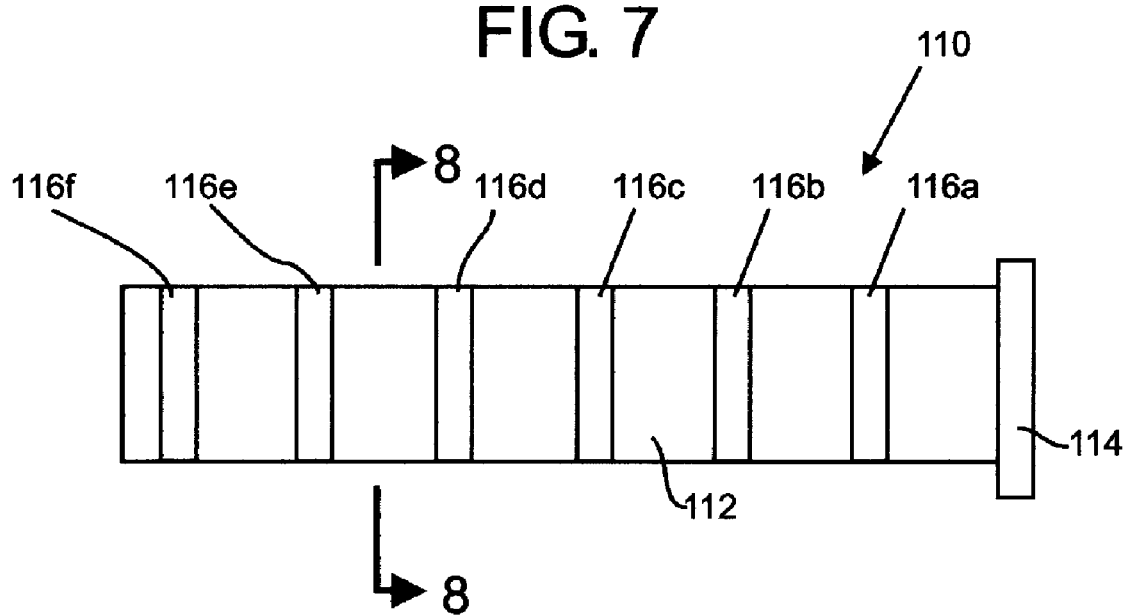
FIG. 7 is a top plan view of another embodiment of an interface module according to the present invention.
Figure 8:
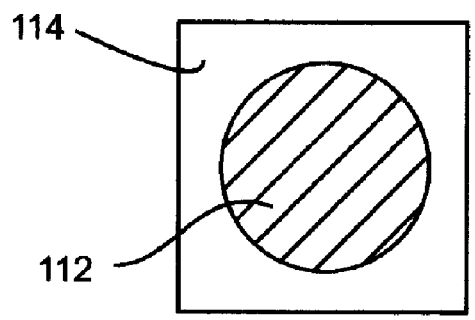
FIG. 8 is a section view taken along line 8-8 of FIG. 7.

FIG. 7 shows another embodiment of a SIM card 110. The card 110 includes a body 112, a head 114, and six electrical contacts 116a-116f. As shown in FIG. 8, the body 112 is circular in cross-section and the head 114 is rectangular. Again, the shapes may vary as selected for a particular application.

Figure 9:
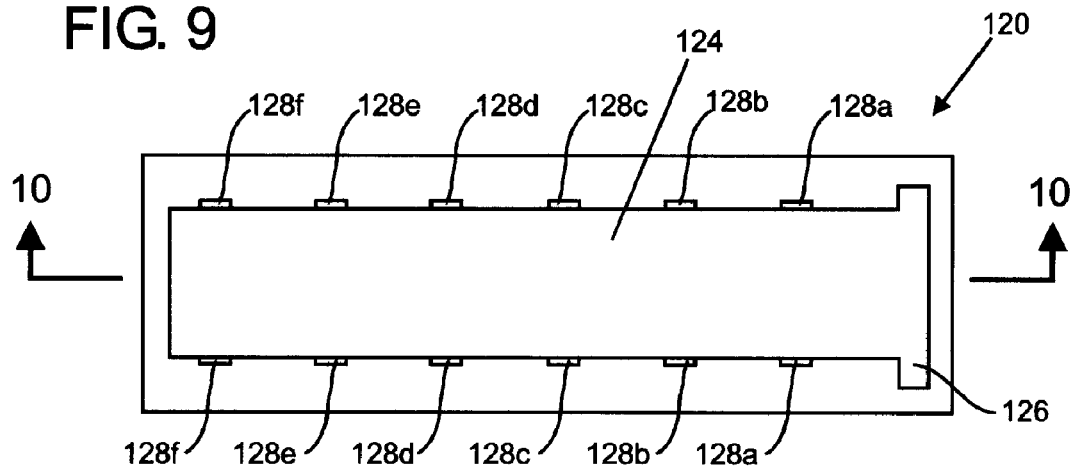
FIG. 9 is a top plan view of another embodiment of an interface module reader according to the present invention.
Figure 10:
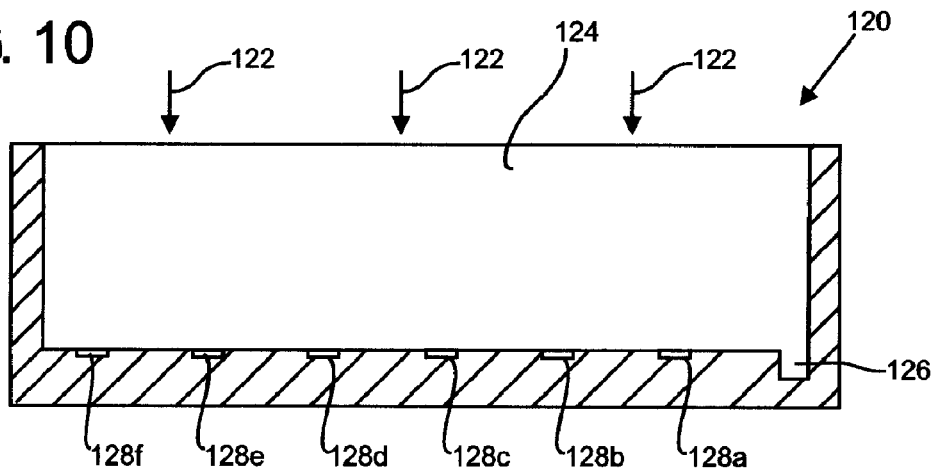
FIG. 10 is a longitudinal section view taken along line 10-10 of FIG. 9.
Figure 11:
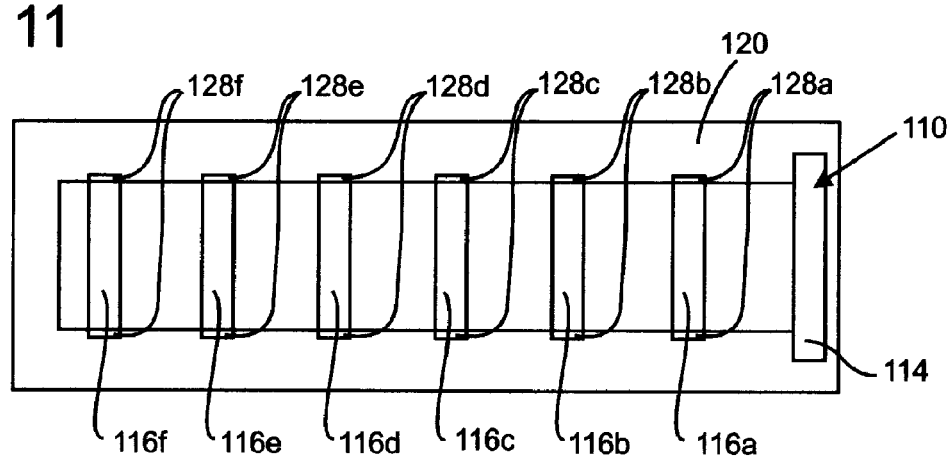
FIG. 11 is a top plan view of an embodiment of an interface module assembly in accordance with the present invention.

FIGS. 9 and 10 respectively show a top view and a side elevation view of an embodiment of a card reader 120 for the card 110 of FIG. 7. The card reader 120 may also be referred to as a socket. The card 110 may be inserted into the socket 120 downward 122 from the top (FIG. 10). The card reader 120 includes an area 124 to receive the body 112 and an additionally recessed area 126 for the head 114. Six electrical contacts 128a-128f are provided with the card reader 120. FIG. 11 shows a plan view of the card 110 inserted into the socket 120. The head 114 ensures that the card is properly installed, since the head 114 will only fit into the corresponding recessed area 126. A benefit of a head that is not round is that the card will not roll on a work surface during handling and installation.

Figure 12:
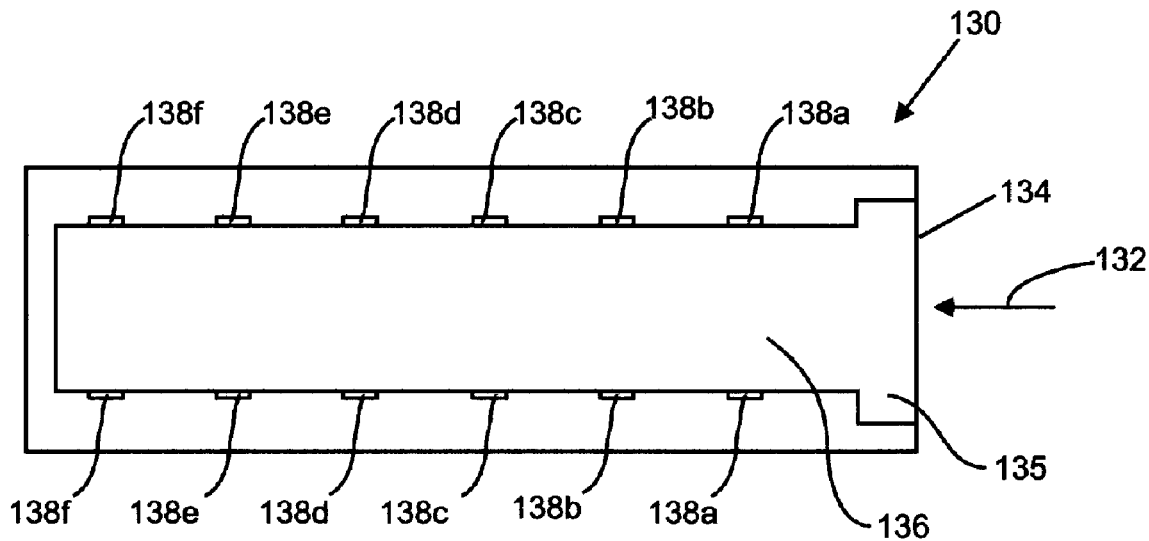
FIG. 12 is another embodiment of an interface module reader in accordance with the present invention.
Figure 13:
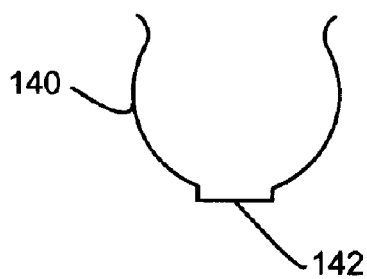
FIG. 13 is an embodiment of an electrical contact according to the present invention.
Figure 14:
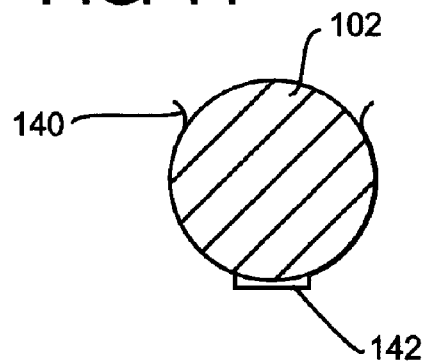
FIG. 14 is a configuration of an interface module embodiment and the electrical contact of FIG. 13.

FIG. 12 shows another embodiment of a socket 130 that may be used with the card 110 of FIG. 7. A card 110 (not shown) may be inserted 132 into the socket 130 from the open end 134. Again the head 114 will prevent incorrect installation, as it must end up in the recessed area 135 at the end of the socket 130. The card body 112 is received in an opening 136, where the card contacts 116a-116f will register with the socket contacts 138a-138f.

Figure 15:
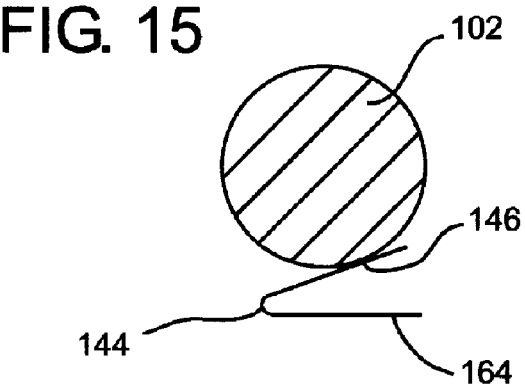
FIGS. 15-17 are other configurations of embodiments of interface modules and electrical contacts.
Figure 16:
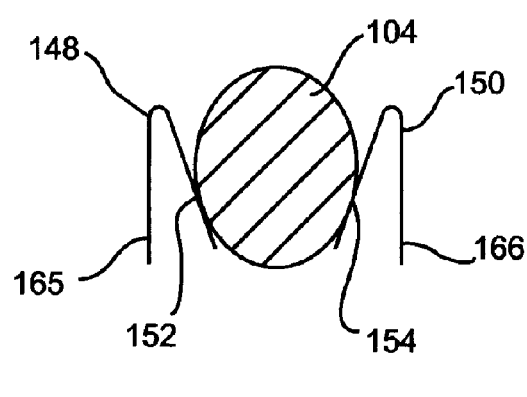
Figure 17:
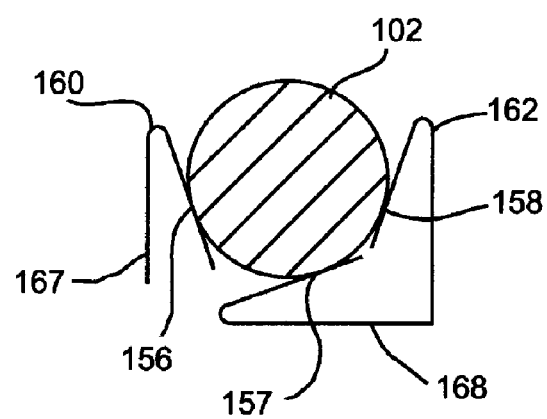

FIGS. 13 through 17 show several embodiments of electrical contacts for the socket. The contact 140 of FIG. 13 and FIG. 14 substantially encircles the card 102, providing continuous contact and also restraint to hold the card 102 in place. The bottom portion 142 of the card may connect to a printed wiring board (PWB) or other conductor. FIGS. 15 through 17 show various configurations using cantilever spring-type contacts. FIG. 15 shows a single spring 144 and contact point 146, while FIG. 16 shows two springs 148, 150 and two points of contact 152, 154. FIG. 17 has three contact points 156-158, one from one spring 160 and two from another spring 162. Ends 164-168 of the springs may connect to printed wiring boards or other conductors. Multiple contacts provide redundancy, which may be particularly desirable for applications where the device may be jarred. Methods of removal of cards from sockets may also be provided. Examples of such methods include providing a ribbon underneath a top-loaded card such that pulling the ribbon discharges the card. A lever may also be used to pry the card upward out of the top-loading socket or outward from an end-loaded socket. A string with a loop could also extend from the card itself.

FIG. 18 shows an example of mobile terminal as a cellular telephone 170 that incorporates an embodiment of an interface module assembly 172 according to the present invention. The interface module assembly 172 includes a card 174 and card reader 176.

Figure 19:
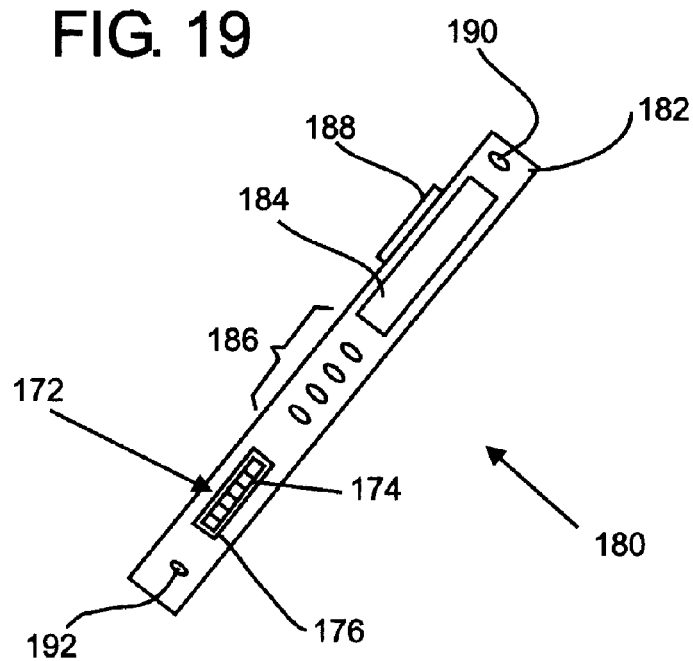
FIG. 19 is a side elevation view of another embodiment of a mobile terminal in accordance with the present invention.

FIG. 19 shows another example of a cellular telephone 180 that incorporates an interface module assembly 172 with a card 174 and card reader 176. The cellular telephone 180 includes a housing 182, a display 184, function buttons 186, a volume button 188, an earpiece 190, and a microphone 192.

The shape of the interface module assembly 172 may allow the housing 182 to be round and potentially approximately the size of a conventional fountain pen, for example, approximately 1 cm diameter by 14 cm long. Other cross sectional shapes are also possible. Access to user interface aspects of the phone 180, display 184, microphone 192, earpiece 190, as so forth could be external devices that connect to the phone 180 by wired or wireless methods such as Bluetooth or infrared.

Figure 20:
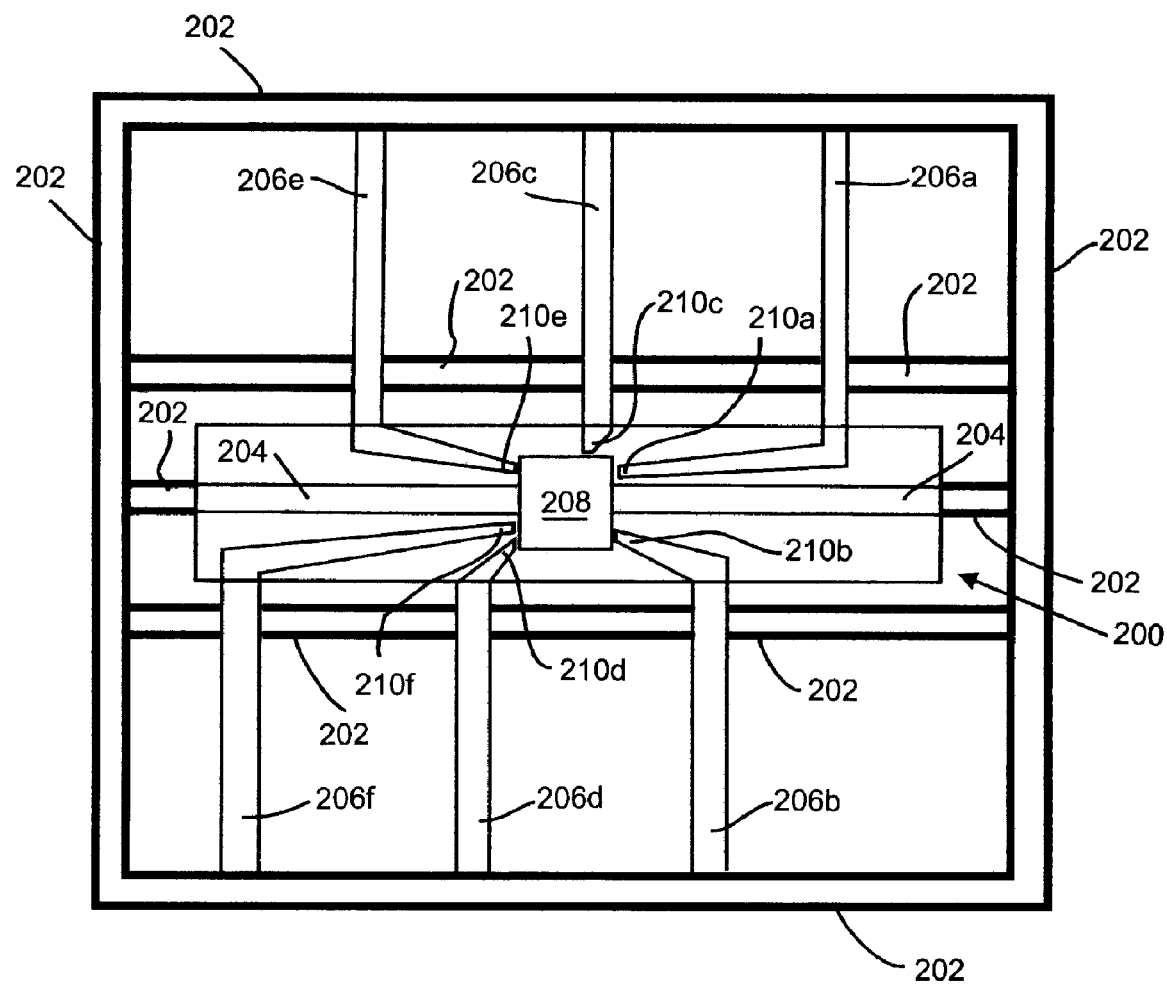
FIG. 20 is apparatus for making an embodiment of an interface module according to the present invention.

FIG. 20 shows a configuration for making a card 200 according to the present invention. A metal frame is provided that includes portions for structural support 202 outside of the prospective card limits (shaded), portions for structural support 204 within the card limits, and portions that will serve as the active leads 206a-206f. A die 208, which is a piece of silicon on which an integrated circuit is fabricated prior to packaging, is placed in the center of the card, though the location may vary from that shown. Each of the active leads 206a-206f have a bond pad 210a-210e proximate to the die, and wire bonds are made from the die 208 to the bond pads 210a-210f. The assembly of the die 208, the leads 206a-206f, bond pads 210a-210f, and portion 204 of the frame within the card's limits is then encapsulated in an epoxy encapsulate, plastic, or the like. The body may instead be formed by preformed top and bottom elements that are affixed to each other, or by other means known to one of skill in the art.

Once encapsulated, the structural support portions 202 of the frame that are outside of the limits of the card 200 are trimmed to be separated from the card 200 and active lends 206a-206f. The remaining active leads 206a-206f are wrapped around the card 200 to form a ring. The end of each active lead 206a-206f is then tack welded, soldered, adhesively bonded, or by other means connected to a point on the same band.

One of ordinary skill in the electrical device arts will quickly recognize that the invention has other applications in other environments. It will also be understood by someone of ordinary skill in the art that the functionality of the interface modules may vary widely. In fact, many embodiments and implementations are possible. For example, the cards may function as storage devices for identification information, security information, financial information, and programs, all without departing from the scope of the present invention. An interface module could be used as a memory device with a mobile terminal that could provide expanded memory for storage of phonebooks, pictures, ring-tones, feature content, and the like. The following claims are in no way intended to limit the scope of the invention to the specific embodiments described. It should be understood by those skilled in the art that the foregoing modifications as well as various other changes, omissions and additions may be made without parting from the spirit and scope of the present invention.

What is claimed is:

1. An interface module for an electronic device, comprising:
   a card including a card body and at least one component selected from the group including memory, a processor, and a power source, the card body having a longitudinal axis and electrical contacts spaced along the longitudinal axis that extend continuously over at least one half of the periphery around the card body, wherein the card body has a cross-sectional shape other than one bounded by substantially parallel major surfaces; and
   a head at one end of the card body, the head extending outward from the longitudinal axis of the card body a greater distance than the card body.

2. The interface module of claim 1, wherein the cross-sectional shape of the card body is substantially circular.

3. The interface module of claim 1, wherein the cross-sectional shape of the card body is substantially elliptical.

4. The interface module of claim 1, wherein the electrical contacts on the card body extend completely around the periphery of the card body.

5. The interface module of claim 1, wherein the cross-sectional shape of the head is selected from the group comprising substantially circular, substantially elliptical, and a shape having at least three substantially straight sides.

6. An interface module for an electronic device, comprising:
   a card including a card body and at least one component selected from the group including memory, a processor, and a power source, the card body having a longitudinal axis and electrical contacts spaced along the longitudinal axis that extend continuously over at least one half of the periphery around the card body, wherein the card body has a cross-sectional shape that is substantially rectangular and other than substantially planar, and wherein a substantially planar shape is one having a height to width ratio of less than approximately 0.5; and
   a head at one end of the card body, the head extending outward from the longitudinal axis of the card body a greater distance than the card body.

7. The interface module of claim 6, wherein the electrical contacts on the card body extend completely around the periphery of the card body.

8. An interface module for an electronic device, comprising:
   a card including a card body and at least one component selected from the group including memory, a processor, and a power source, the card body having a longitudinal axis and electrical contacts spaced along the longitudinal axis that extend continuously over at least one half of the periphery around the card body, wherein the cross-sectional shape of the card body is selected from the group including substantially circular, substantially elliptical, substantially rectangular and other than substantially planar and having a height to width ratio of at least 0.5, and a shape other than a rectangle having at least three substantially straight sides; and
   a head at one end of the card body, the head extending outward from the longitudinal axis of the card body a greater distance than the card body.

* * * * *